(No Model.)

W. H. TAYLOR.
LOCK HUB.

No. 580,963. Patented Apr. 20, 1897.

Witnesses:
Herbert Bradley
Geo. E. Cruse

Inventor
Warren H. Taylor
By Knight Bros
Attorneys

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

LOCK-HUB.

SPECIFICATION forming part of Letters Patent No. 580,963, dated April 20, 1897.

Application filed July 13, 1896. Serial No. 599,012. (No model.)

*To all whom it may concern:*

Be it known that I, WARREN H. TAYLOR, a citizen of the United States, residing at Stamford, in the county of Fairfield and State of Connecticut, have invented certain new and useful Improvements in Lock-Hubs, of which the following is a specification.

The object of my present invention is to produce a hub which will be better mechanically and more economical to manufacture than the usual hub and arm which are made in one piece. I construct my hub in two or more pieces, the trunnions sometimes being made separate from the latch or bolt actuating arm, and sometimes one trunnion is made separate from the latch or bolt actuating arm and sometimes one trunnion is made separate and the other is made integral with the actuating-arm. In all cases the portion upon which the latch-operating arm is formed is made in solid form and fits within the struck-up portion, the latter being recessed for the projection of the latch-operating arm or arms and the parts being thereby fixed against relative turning. By this construction I am in any case able to do the necessary machining more economically and satisfactorily, and I am able, if desired, to make the hub wholly or partly from the sheet or drawn metal. The parts as will be hereinafter described are made so that they may be joined together in operative relation with practically no trouble or expense.

In order that my invention may be fully understood, I will proceed to describe the same with reference to the accompanying drawings, in which—

Figure 1:
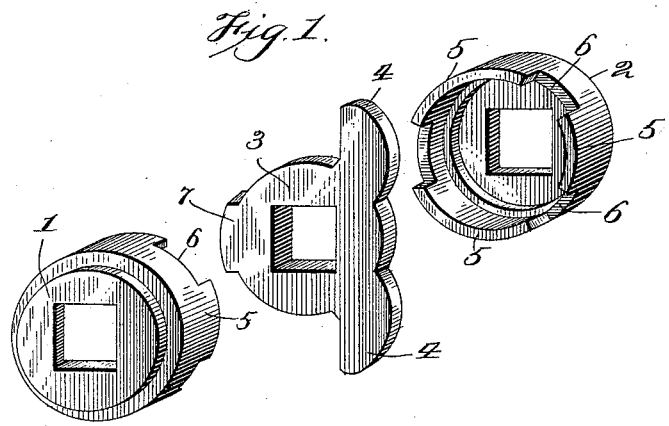
Figure 2:
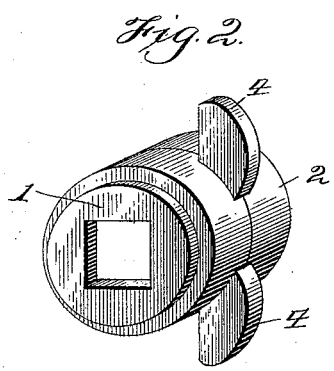
Figures 3, 4:
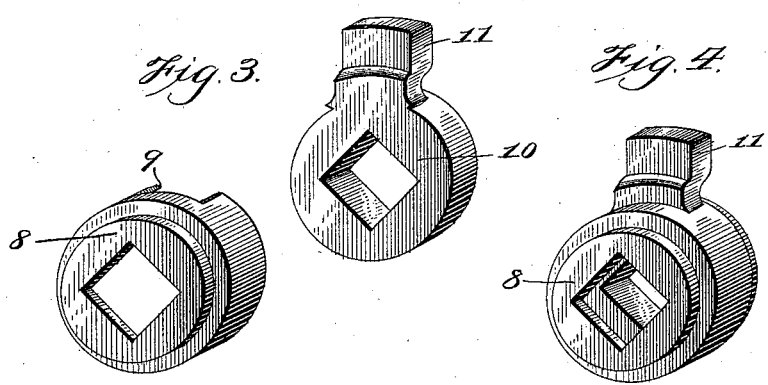

Figure 1 is a detail perspective view of the several parts composing the hub and showing them in position for assembling. Fig. 2 is a perspective view of the hub, the parts being assembled. Fig. 3 is a view similar to Fig. 1, but showing a modification of the hub for a different form of lock; and Fig. 4 is a perspective view of the form of hub shown in Fig. 3, the parts being assembled.

In the said drawings, and referring to Figs. 1 and 2, 1 represents one of the trunnions, which is struck up from sheet metal, 2 represents the other trunnion, similarly formed, and 3 the piece on which the arms 4 for operating the lock or latch mechanism are formed. The flange 5 on each trunnion is formed with the recesses 6, in which the projection 7 and the lugs 4 on the piece 3 fit, and the parts are then put together, as shown in Fig. 2, by pressing or any other suitable means.

In the form shown in Figs. 3 and 4, which is a modification, instead of the two trunnions and the separate piece secured between them I employ a single trunnion 8, having a recess 9, in which the arm 11 of the piece 10 fits. The piece 10 in this form serves as the other trunnion for the hub. In this form, as in the other, the two parts composing the hub may be put together by any desired means.

The construction of the hub may be varied at will, owing to the form of lock in which the hub is to be inserted, and the trunnions and the piece carrying the arm or arms may be of any design or may be struck up from any desired metal, the essential features being a lock-hub composed of two or more pieces, the trunnions sometimes being made separate from the latch or bolt actuating arm, and sometimes one trunnion is made separate and the other is made integral with the actuating-arm.

Having thus described my invention, the following is what I claim as new therein and desire to secure by Letters Patent:

1. A lock-hub comprising a cup-shaped metal portion provided with a recess and a metal portion carrying the latch-operating arm fitted within said cup-shaped portion and engaging the recess thereof, as explained.

2. A lock-hub comprising a recessed cup-shaped metal trunnion and a metal latch-operating portion fitted within said recessed cup-shaped trunnion; said latch-operating portion having a trunnion formed thereon as specified.

WARREN H. TAYLOR.

Witnesses:
SCHUYLER MERRITT,
GEO. E. WHITE.